United States Patent [19]

Singbartl

[11] 4,288,746
[45] Sep. 8, 1981

[54] MEASURING SENSOR

[75] Inventor: Günther Singbartl, Hanover, Fed. Rep. of Germany

[73] Assignee: Wabco Westinghouse GmbH, Hannover, Fed. Rep. of Germany

[21] Appl. No.: 953,529

[22] Filed: Oct. 23, 1978

[30] Foreign Application Priority Data

Dec. 12, 1977 [DE] Fed. Rep. of Germany ....... 2755379

[51] Int. Cl.$^3$ .............................................. G01P 3/48
[52] U.S. Cl. .................... 324/174; 324/173; 324/167
[58] Field of Search ............... 324/163, 166, 168, 171, 324/173–175, 207, 208

[56] References Cited

U.S. PATENT DOCUMENTS

| 3,243,692 | 3/1966 | Heissmeier | 324/174 |
| 3,460,033 | 8/1969 | Weir et al. | 324/174 |
| 3,870,911 | 3/1975 | Togama | 324/174 |
| 3,898,563 | 8/1975 | Erisman | 324/174 |

Primary Examiner—Michael J. Tokar
Attorney, Agent, or Firm—J. B. Sotak

[57] ABSTRACT

A speed measuring sensing device for producing a signal corresponding to the relative angular rotation between two structural members including a rotor arranged on the rotating member and a stator mounted on the stationary member. The stator is separated from the rotor by an air gap. The rotor includes a plurality of magnetizable sectors which vary the magnetic field while passing a pole shoe of the stator. The surface area of each of the magnetizable sectors of the rotor and the surface area of the pole shoe of the stator exhibit a maximum ratio of 1 to 1.

6 Claims, 2 Drawing Figures

MEASURING SENSOR

FIELD OF THE INVENTION

This invention relates to a speed measuring sensor for generating a signal corresponding to the selective rotation between two relatively movable elements and, more particularly, to a sensing device having a rotor mounted to the rotating portion and a stator carried on the stationary portion and being separated from the moving rotor by an air gap and wherein the rotor includes magnetizable sectors which change the magnetic field when the pole shoe of the stator is passed.

BACKGROUND OF THE INVENTION

It will be appreciated that speed measuring sensors are used in various installations to monitor the rotational motion of shafts, axles and wheels, particularly, vehicles provided with anti-skid braking devices.

Such angular velocity measuring sensors primarily consist of a fixed electromagnetic stator and a movable rotor member which may be provided with openings, teeth or slots. The magnetic field generated by the electromagnet is repeatedly interrupted by the openings, teeth, or slots of the moving rotor which may be fixedly attached to the rotating wheel of the vehicle. Thus, the toothed rotor causes a periodic change in the magnetic flux which induces an electrical output signal in the stator winding. The frequency of the output signal is proportional to the angular velocity of the rotating wheel.

In order to obtain the strongest and most precise output signal possible, it is necessary that the dimension of the space or air gap between the pole shoe of the magnetic stator and the teeth of the rotor be very small and be held constant. If the width of the air gap changes during operation, spurious signals, i.e., erroneous information, will adversely affect the braking force control on the wheel in question in the vehicle anti-skid system. It will be appreciated that a change in the air gap can be caused in a speed sensor for wheeled vehicles by wear and play in the axle bearing or by vibrations, particularly during a braking operation. When the rotor approaches the stator, the amount of flux cutting the coil of the stator becomes greater, and hence, the electromagnetic field building up between the rotor and stator becomes stronger. Conversely, when the rotor moves or shifts away from the pole face of the stator, the electromagnetic field coupling the coil therefore becomes weaker.

A particular critical condition occurs when a fluctuation or change in the air gap is caused by mechanical vibrations of the rotor when the vehicle is stopped and the face of the pole shoe of the stator is situated opposite a magnetizable sector of the rotor. It has been found that a nonexistent rotational motion or false movement of the vehicle wheel is simulated by this condition.

Previous attempts have been made to eliminate such unwanted interference signals or perturbing voltages from occurring when the air gap varies. Various ways and means have been employed to prevent the occurrence of such perturbations or noise voltages. This was accomplished in prior art measuring sensing arrangements by employing a signal filtering network generally consisting of attenuating elements forming part of the electronic logic circuitry which is connected in series with the speed measuring sensor. An alternate method for handling such spurious noise or interference was to design the electromagnetic stator of the speed measuring sensor with three magnetic arms or legs. The two external arms of the E-shaped stator carry the signal windings while no winding is wound on the center leg or arm. Due to this special design of the stator structure, the changes in the magnetic reluctance caused in each case in the stator arms by rotation of the rotor member are shifted out of phase by about 180° relative to each other. Conversely, any variation in the magnetic reluctance caused in the magnetic arms or legs by fluctuations in the width of the air gap are essentially in phase so that the output signals generated in the windings or coils is approximately zero in the case of vibrational changes.

It will be appreciated that these previous known measuring sensors are relatively complex in design and very expensive to manufacture.

OBJECTS AND SUMMARY OF THE INVENTION

Accordingly, an object of this invention is to provide a new and improved speed measuring sensor in which the occurrence of spurious signals or perturbing voltages is greatly reduced.

A further object of this invention is to provide a speed measuring arrangement which is simpler in design and cheaper to manufacture than prior known speed measuring sensors.

The above objects are achieved by providing a speed measuring sensor which produces an output signal corresponding to the angular rotation between two relatively movable components and including a rotor member driven by the rotating component and a stator member carried by the stationary component. The stator is separated from the rotor by an air gap, the rotor includes a plurality of magnetizable sectors which change the magnetic field while passing the pole shoe of the stationary mounted stator, characterized by the fact that the surface area of each of the plurality of magnetizable sectors of the rotor and the surface area of the pole shoe of the stator exhibits a maximum ratio of 1 to 1.

Further objects and advantages of this invention are to provide a speed sensing device having a rotor including a plurality of magnetizable sectors, each of which has a circular cross-sectional shape.

An additional object of this invention is to provide a speed measuring sensor having a rotor which includes recesses formed between magnetizable sectors with the maximum dimension of each of the recesses equal to the maximum dimension of a pole shoe of a stator.

Another object of this invention is to provide a speed measuring device having a rotor which includes magnetizable sectors and in which the maximum dimension of each of the magnetizable sectors is equal to the maximum distance between two adjacent magnetizable sectors.

Yet another object of this invention is to provide a novel speed measuring sensor having a rotor including magnetizable sectors and having a stator including a pole shoe with each of the magnetizable sectors and the pole shoe having equal circular surface areas.

Yet a further object of this invention is to provide a new speed measuring sensor having a rotor which includes a plurality of magnetizable sectors in the form of cylindrical bodies arranged in peripheral alignment on the rotor.

Still another object of this invention is to provide a unique speed measuring device having a rotor which includes a plurality of magnetizable sectors and having a stator which includes a pole shoe having the same shape as each of the plurality of the magnetizable sectors.

An additional substantial advantage of the speed measuring sensor of this invention resides in the fact that the effective magnetic surfaces are equal, namely, surface area of the stator pole shoe and the surface area of the magnetizable sectors of the rotor are the same so that a change in the magnetic field in the case of an undesired decrease or increase in the air gap between the stator pole shoe and the magnetizable sector of the rotor is reduced to a minimum. Thus the production of noise signals is virtually ruled out.

BRIEF DESCRIPTION OF THE DRAWINGS

The foregoing objects and advantages and other attendant features will become more readily appreciated as the subject invention becomes better understood by reference to the following detailed description when considered in the accompanying drawings wherein.

DETAILED DESCRIPTION OF THE INVENTION

Figure 1:
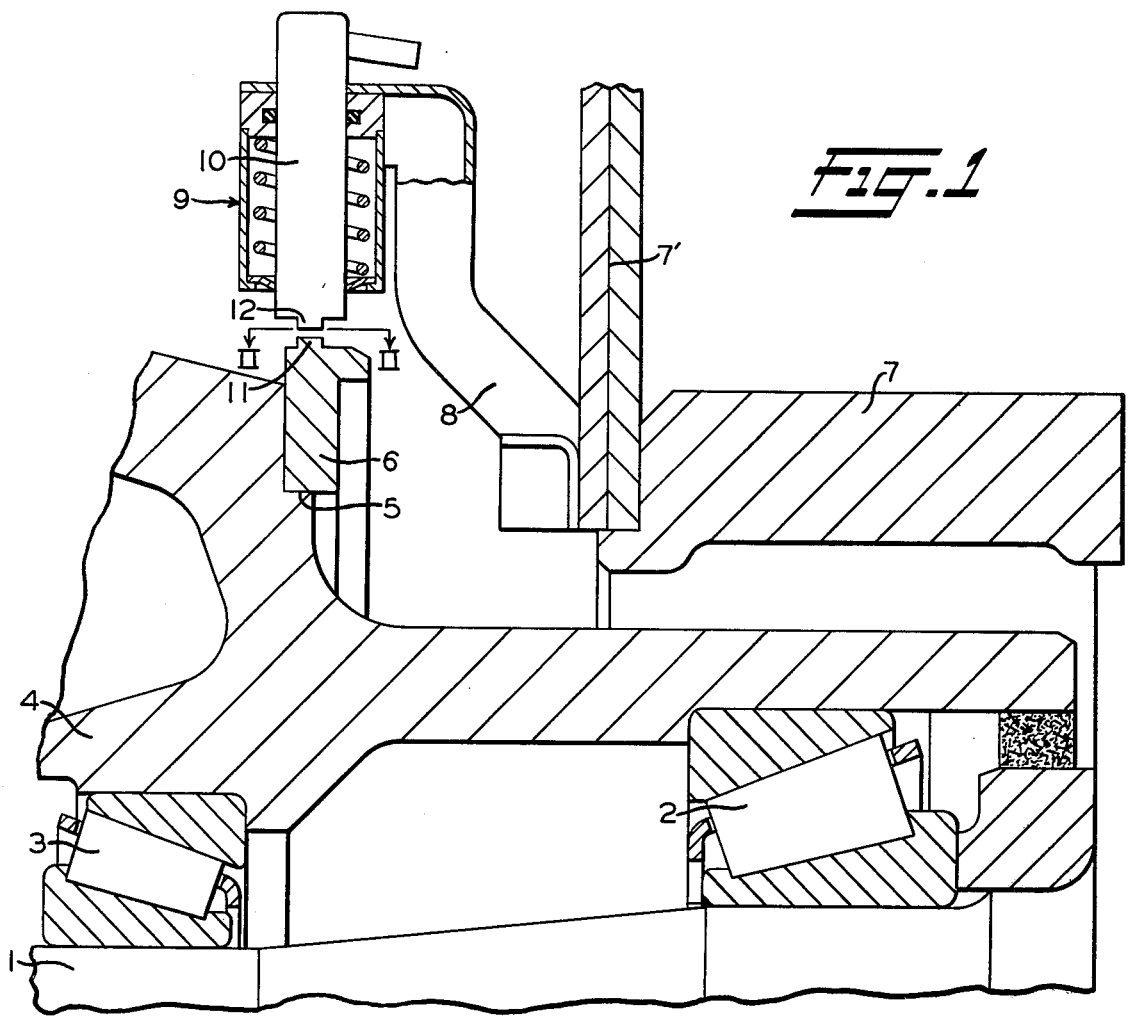
FIG. 1 is a fragmentary sectional view of the speed measuring sensor of the present invention in combination with the wheel and axle of a vehicle.

Referring to the drawings, there is shown the speed measuring sensor for determining the rotation of a vehicle wheel.

Figure 2:
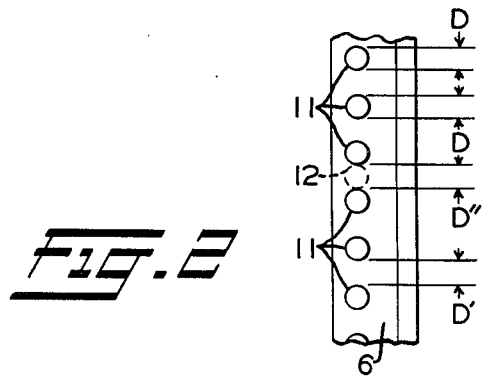
FIG. 2 is a partial cross-sectional view, taken along lines II—II of FIG. 1, of the rotor and the stator pole shoe shown in phantom.

Referring now to the drawings and in particular to FIG. 1, there is shown a vehicle wheel speed sensing arrangement including a stationary stator and a movable rotor disposed in spaced relationship with the stator. As shown, a vehicle axle 1 is provided with a pair of conical roller bearings 2 and 3 which are disposed in axially spaced relationship on axle 1. In practice, a vehicle wheel (not shown) is mounted on a wheel hub 4 which is associated with and is rotated on conical roller bearings 2 and 3. The rotatable wheel hub 4 includes an annular shoulder 5 which is machined, or the like, in the inner surface of the enlarged portion of hub 4. The shoulder is adapted to form an annular seat for a ring-like or annular rotor 6. The rotor 6 consists of a magnetic ring having a plurality of identical cylindrical elevations or circular projections 11 arranged equidistant from each other on the periphery of the annular rotor 6. As shown in FIG. 2, each of the cylindrical projections has a diameter D which is equal to the distance or space D' between two adjacent projections.

As shown in FIG. 1, the nonrotatable or stationary structure of the assembly includes a brake support or carrier member 7 having a brake band bracket 7' suitably secured thereto. The brake support and bracket members are adapted to carry an angular arm member 8 which is securely attached, by being bolted or the like, to the back end of a metallic or plastic connecting housing or casing assemblage 9 which carries a stator 10. The assemblage 9 may be of the type shown and disclosed in my U.S. Pat. No. 4,078,185. As shown, the stator 10 includes a dependent pole shoe 12 which is cylindrical or circular in shape and exhibits the same diameter D'' as the cylindrical elevations 11 of the rotor 6. It has been found advantageous to provide the magnetizable sectors of the rotor 6 with the same shape and surface area as the stator pole shoe 12. Thus, the surface area of the stator pole shoe 12 will no longer overlap a number of teeth or salient portions of the rotor as was the case in prior speed measuring sensors. That is, when the stator pole shoe is situated opposite a greater magnetically active surface, it is possible to reduce the change in the stray field even in the case of air gap changes and thus prevent interference or spurious voltages in this way. The term, magnetically active surface, means the surface around which the magnetic field builds up.

It is apparent that other designs and configurations than those described above for the magnetizable sectors of the rotor are of course possible in accordance with the invention, provided these sectors do not exceed the dimensions of the stator pole shoe so that the ratio of the surface areas is 1 to 1. Other changes and ramifications will undoubtedly occur to those skilled in the art that are deemed to fall within the preview of the present invention which is intended to be limited only as set forth in the appended claims. Thus, it is understood that the showing and description of the present invention is intended to disclose the best mode, but it is understood that other variations and changes are possible in practicing this invention.

Having now described the invention, what I claim as new and desire to secure by Letters Patent is:

1. A speed measuring sensor for producing an output signal corresponding to the angular rotation between two relatively movable components and including a rotor driven by the rotating component and a stator carried by the stationary component, the stator includes only a single dependent cylindrical pole shoe, the pole shoe of the stator is separated from the rotor by an air gap, the rotor includes a ring-like magnetic member having a plurality of magnetizable projecting sectors of equal dimensions which change the magnetic field while passing the pole shoe of the stationary mounted stator, characterized in that the surface area of each of the plurality of the magnetizable sectors of the rotor and the surface area of the pole shoe of the stator exhibit a maximum ratio of 1 to 1 and in that the maximum cross sectional dimension of each of the magnetizable sectors of the rotor is equal to the maximum distance between two adjacent magnetizable sectors of the rotor so that spurious noise signals are minimized.

2. A speed measuring sensor according to claim 1, characterized in that each of the plurality of the magnetizable sectors of the rotor has a circular cross-sectional shape.

3. A speed measuring sensor according to claim 1, characterized in that the rotor includes recesses formed between the magnetizable sectors with the maximum dimension of each of the recesses equal to the maximum dimension of the pole shoe of the stator.

4. A speed measuring sensor according to claim 1, characterized in that each of the plurality of the magnetizable sectors of the rotor and the pole shoe of the stator are equal circular surface areas.

5. A speed measuring sensor according to claim 1, characterized in that each of the plurality of the magnetizable sectors of the rotor take form of cylindrical bodies arranged in peripheral alignment on the rotor.

6. A speed measuring sensor according to claim 1, characterized in that each of the plurality of the magnetizable sectors of the rotor has the same shape as the pole shoe of the stator.

* * * * *